US012739051B2

(12) United States Patent
Rodriguez Bravo

(10) Patent No.: US 12,739,051 B2
(45) Date of Patent: Sep. 15, 2026

(54) IDENTIFICATION AND MITIGATION OF ATTACKS AND/OR MALFUNCTION OF AUTONOMOUS VEHICLES SENSOR INVOLVING DISAPPEARING OBJECT

(71) Applicant: Kyndryl, Inc., New York, NY (US)

(72) Inventor: Cesar Augusto Rodriguez Bravo, Alajuela (CR)

(73) Assignee: Kyndryl, Inc., New York, NY (US)

( * ) Notice: Subject to any disclaimer, the term of this patent is extended or adjusted under 35 U.S.C. 154(b) by 76 days.

(21) Appl. No.: 18/632,371

(22) Filed: Apr. 11, 2024

(65) Prior Publication Data

US 2025/0323751 A1 Oct. 16, 2025

(51) Int. Cl.
*B60W 60/00* (2020.01)
*H04K 3/00* (2006.01)

(52) U.S. Cl.
CPC ......... *H04K 3/20* (2013.01); *B60W 60/00188* (2020.02); *H04K 3/90* (2013.01); *H04K 2203/22* (2013.01)

(58) Field of Classification Search
None
See application file for complete search history.

(56) References Cited

U.S. PATENT DOCUMENTS 8,781,669 B1 7/2014 Teller et al.
9,195,232 B1 11/2015 Egnor et al.
9,368,026 B1 6/2016 Herbach et al.
11,467,256 B2 10/2022 Eichenholz et al.
2014/0358353 A1 12/2014 Ibanez-Guzman et al.
2018/0039269 A1* 2/2018 Lambermont ........... G05D 1/81
2019/0258251 A1 8/2019 Ditty et al.
2020/0156538 A1* 5/2020 Harper ................... G10K 11/34
2020/0233060 A1* 7/2020 Lull ...................... G01S 7/4039
2021/0112094 A1 4/2021 Liu et al.
2021/0155268 A1* 5/2021 Oba ...................... B60K 35/25
2022/0057519 A1 2/2022 Goldstein et al.
2023/0056233 A1 2/2023 Cyr et al.
(Continued)

FOREIGN PATENT DOCUMENTS

WO 2017018743 A1 2/2017

OTHER PUBLICATIONS

Anonymous, "Time to hit the panic button on driverless cars?" The Dallas Morning News, URL: https://www.dallasnews.com/opinion/commentary/2014/06/11/time-to-hit-the-panic-button-on-driverless-cars/, Pub: Jun. 10, 2014, Retrieved: Jan. 24, 2024, 5 pages.
(Continued)

*Primary Examiner* — Abdhesh K Jha
*Assistant Examiner* — Tawri M Mcandrews
(74) *Attorney, Agent, or Firm* — CANTOR COLBURN LLP; Erik Swanson

(57) ABSTRACT

Embodiments relate to the identification and mitigation of jamming attacks on autonomous vehicles. A technique includes determining that an object previously detected is no longer detected by a sensor of a vehicle. The technique includes, in response to the object previously detected no longer being detected by the sensor, determining that another sensor of the vehicle detects the object. The technique includes, in response to the object previously detected no longer being detected by the sensor, performing safety actions based on another sensor detecting the object.

20 Claims, 10 Drawing Sheets

700

DETERMINE THAT AN OBJECT PREVIOUSLY DETECTED IS NO LONGER DETECTED BY A SENSOR OF A VEHICLE 702

IN RESPONSE TO THE OBJECT PREVIOUSLY DETECTED NO LONGER BEING DETECTED BY THE SENSOR, DETERMINE THAT ANOTHER SENSOR OF THE VEHICLE DETECTS THE OBJECT 704

IN RESPONSE TO THE OBJECT PREVIOUSLY DETECTED NO LONGER BEING DETECTED BY THE SENSOR, PERFORM SAFETY ACTIONS BASED ON THE ANOTHER SENSOR DETECTING THE OBJECT 706

(56) References Cited

U.S. PATENT DOCUMENTS

| | | | | |
|---|---|---|---|---|
| 2023/0406356 | A1* | 12/2023 | Balakrishnan | G06V 20/56 |
| 2024/0124031 | A1* | 4/2024 | Kim | B60W 60/0053 |
| 2025/0095373 | A1* | 3/2025 | Monteuuis | G06T 7/70 |

OTHER PUBLICATIONS

Anonymous, "Trajectory Prediction," URL: https://paperswithcode.com/task/trajectory-prediction, Retrieved: Jan. 24, 2024, 10 pages.
Bilton, "There is Only an "Emergency Stop" Button in Google's Second Generation Driverless Car," URL: https://www.biltonlaw.com/emergency-stop-button-in-googles-driverless-car/, Retrieved: Dec. 27, 2023, 6 pages.
Cao et al., "You Can't See Me: Physical Removal Attacks on LiDAR-based Autonomous Vehicles Driving Frameworks," arXiv:2210.09482v2 [cs.CR] Oct. 27, 2022, pp. 1-20.
Gastelu, "General Motors reveals autonomous car with no steering wheel," URL: https://www.foxnews.com/auto/general-motors-reveals-autonomous-car-with-no-steering-wheel, Published: Jan. 12, 2018, Retrieved: Jan. 24, 2024, 10 pages.
Jakobsen et al., "Analysis of Sensor Attacks against Autonomous Vehicles," Proceedings of the 8th International Conference on Internet of Things, Big Data and Security—IoTBDS, 2023, 8 pages.
Kharpal, "How Google driverless cars deal with emergencies," URL: https://www.cnbc.com/2015/12/02/how-google-driverless-cars-deal-with-emergencies.html, Published: Dec. 2, 2015, Retrieved: Jan. 24, 2024, 7 pages.
Kwon et al., "Autonomous Emergency Stop System," IEEE Intelligent Vehicles Symposium (IV), Jun. 8-11, 2014, pp. 444-449.
Lachance, "Scientists trick lidar units into failing to see pedestrians," RDN Repairer Driven News, Nov. 25, 2022, 4 pages.
Mehdi, "Trajectory Prediction for ADAS," Medium, Analytics Vidha, Sep. 26, 2020, 16 pages.
Rossi et al., "Vehicle trajectory prediction and generation using LSTM models and GANs," PLOS ONE, Jul. 1, 2021, pp. 1-28.
Thompson, "Here's how Google's self-driving cars know what to do in an emergency situation," URL: https://www.businessinsider.com/how-googles-self-driving-cars-respond-to-emergency-sirens-2015-12?IR=T, Pub: Dec. 2, 2015, Retrieved: Jan. 24, 2024, 11 pages.

* cited by examiner

100
Mass Storage 110
Hard Disk 108
Software 111
I/O Adapter 106
Network 112
Communications Adapter 107
System Bus 102
System Memory 103
RAM 105
ROM 104
101
CPU 101a
CPU 101b
CPU 101c
Display Adapter 115
Display 119
Interface Adapter 116
Microphone 124
Speaker 123
Mouse 122
Keyboard 121

VEHICLE 200
NETWORK 250
SENSORS 240A
SENSORS 240B
SENSORS 240C
SENSORS 240N
ACTUATORS FOR STEERING, BRAKING, ACCELERATING 260
COMPUTER SYSTEM 202
COMMUNICATIONS MODULE 210
ACTIONS DATABASE 230
VEHICLE CONTROL SYSTEM 212
SOFTWARE 204
MACHINE LEARNING MODELS 242
RULES-BASED ALGORITHMS 224
NLP MODELS 228

300
DETERMINE THAT OBJECT SUDDENLY DISAPPEARED FROM LIDAR (SENSOR) 302
IS OBJECT DETECTED BY ANY OTHER SENSOR(S) 304
NO
YES
ALERT USER ABOUT POTENTIAL LIDAR (SENSOR) MALFUNCTION/ATTACK 306
END
EXECUTE SAFETY MEASURES 308
B
INQUIRE IF USER WANTS CONTROL OF THE VEHICLE? 310
NO
YES
SEARCH FOR AVAILABLE USER/MANUAL CONTROLS OF THE VEHICLE 312
A

300
A
PRESENT USER WITH USER/MANUAL CONTROLS OF VEHICLE 320
SWITCH TO (REMOTE) MANUAL CONTROL OF VEHICLE 322
ARE COMMANDS BEING RECEIVED FROM USER? 324
YES
NO
B
DISENGAGE AUTONOMOUS MODE 326
IS THERE A REQUEST FOR AUTONOMOUS MODE FROM USER? 328
NO
YES
REENGAGE AUTONOMOUS MODE 330

NORMAL OPERATION
(PERSON DETECTED: 99%)
402
STOP
200
SENSOR
240

PHYSICAL REMOVAL ATTACK
NO PEDESTRIAN DETECTED
200
SENSOR
240
ADVERSARY DEVICE
410

FIG. 5

OBJECT 402

200

FORWARD PATH/DIRECTION

NO OBJECT DETECTED
FORWARD PATH/DIRECTION
200

OBJECT 402
FORWARD PATH/DIRECTION
200

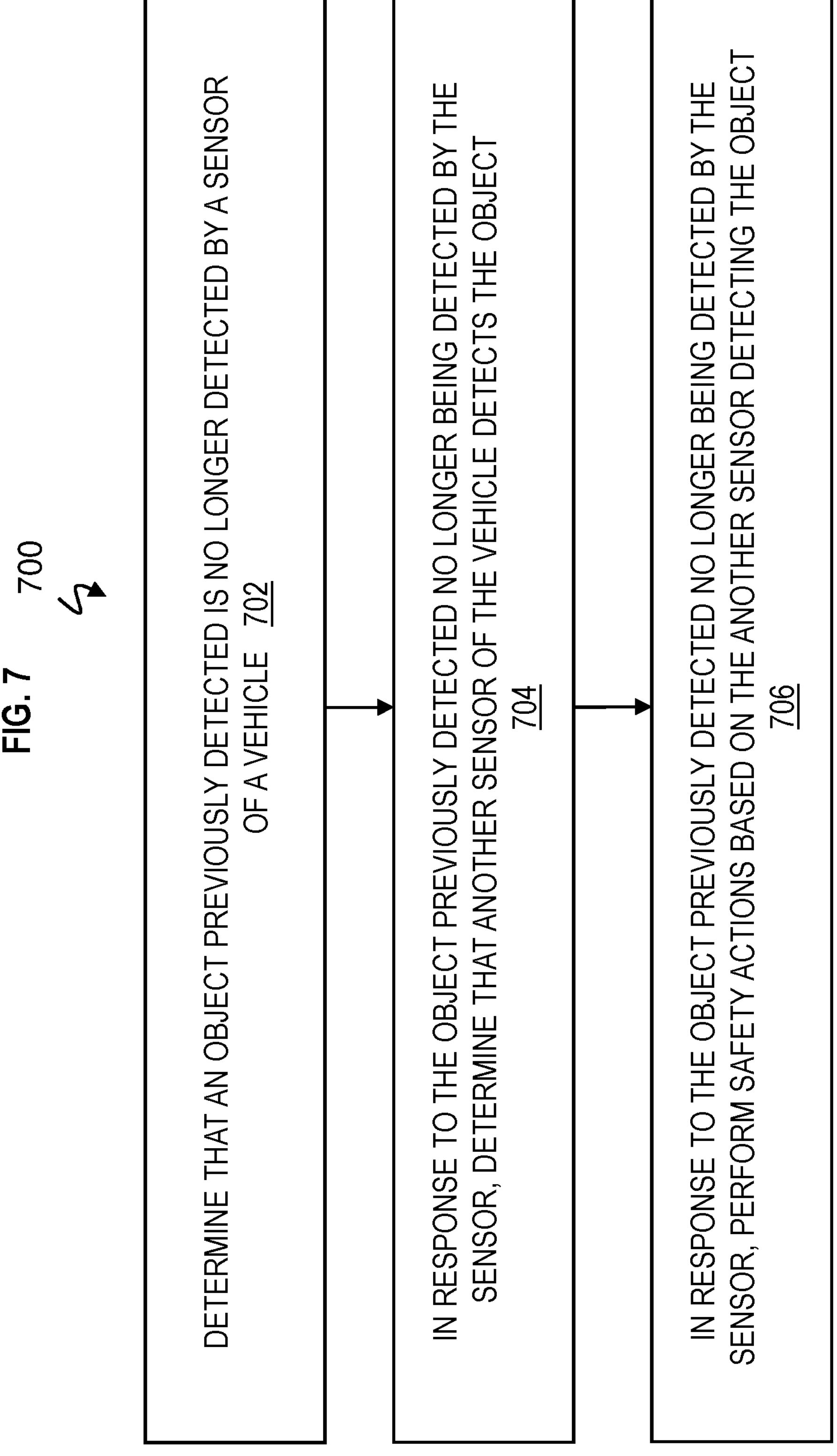
FIG. 7
700
DETERMINE THAT AN OBJECT PREVIOUSLY DETECTED IS NO LONGER DETECTED BY A SENSOR OF A VEHICLE 702
IN RESPONSE TO THE OBJECT PREVIOUSLY DETECTED NO LONGER BEING DETECTED BY THE SENSOR, DETERMINE THAT ANOTHER SENSOR OF THE VEHICLE DETECTS THE OBJECT 704
IN RESPONSE TO THE OBJECT PREVIOUSLY DETECTED NO LONGER BEING DETECTED BY THE SENSOR, PERFORM SAFETY ACTIONS BASED ON THE ANOTHER SENSOR DETECTING THE OBJECT 706

IDENTIFICATION AND MITIGATION OF ATTACKS AND/OR MALFUNCTION OF AUTONOMOUS VEHICLES SENSOR INVOLVING DISAPPEARING OBJECT

BACKGROUND

The present invention generally relates to computer systems, and more specifically, to computer-implemented methods, computer systems, and computer program products configured and arranged for the identification and mitigation of jamming attacks on autonomous vehicles such that safety measures can be performed.

An autonomous vehicle is a vehicle capable of sensing its environment and operating without human involvement. A human passenger is not required to take control of the vehicle at any time, nor is a human passenger required to be present in the vehicle at all. An autonomous vehicle can travel anywhere a traditional car travels and do everything that an experienced human driver does.

The Society of Automotive Engineers (SAE) currently defines 6 levels of driving automation ranging from Level 0 (fully manual) to Level 5 (fully autonomous). These levels have been adopted by the U.S. Department of Transportation. The SAE uses the term automated instead of autonomous. One reason is that the word autonomy has implications beyond the electromechanical. A fully autonomous car would be self-aware and capable of making its own choices. A fully automated car, however, follows orders and then drives itself. The term self-driving is often used interchangeably with autonomous. A self-driving vehicle can drive itself in some or even all situations, but a human passenger must always be present and ready to take control. Self-driving cars would fall under Level 3 (conditional driving automation) or Level 4 (high driving automation). They are subject to geofencing, unlike a fully autonomous Level 5 car that could go anywhere. Moreover, in some cases, a fully autonomous Level 5 car does not have a dashboard or a steering wheel, so a human passenger would not even have the option to take control of the vehicle in an emergency.

Autonomous vehicles rely on sensors, actuators, complex algorithms, machine learning systems, and powerful processors to execute software. Autonomous cars create and maintain a map of their surroundings based on a variety of sensors situated in different parts of the vehicle. Radar sensors monitor the position of nearby vehicles. Video cameras detect traffic lights, read road signs, track other vehicles, and look for pedestrians. Light detection and ranging (LiDAR) sensors bounce pulses of light off the car's surroundings to measure distances, detect road edges, identify lane markings, identify the presence of an object, etc. Ultrasonic sensors in the wheels detect curbs and other vehicles when parking. Sophisticated software then processes all this sensory input, plots a path, and sends instructions to the car's actuators, which control acceleration, braking, and steering. Hard-coded rules, obstacle avoidance algorithms, predictive modeling, and object recognition help the software follow traffic rules and navigate obstacles.

SUMMARY

Embodiments of the present invention are directed to computer-implemented methods for identifying and mitigating jamming attacks on autonomous vehicles. A non-limiting computer-implemented method includes determining that an object previously detected is no longer detected by a sensor of a vehicle, and in response to the object previously detected no longer being detected by the sensor, determining that another sensor of the vehicle detects the object. The method includes, in response to the object previously detected no longer being detected by the sensor, performing safety actions based on another sensor detecting the object.

Other embodiments of the present invention implement features of the above-described methods in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 5 depicts an example of an expected/predicted trajectory of an object according to one or more embodiments of the present invention;

FIG. 7 depicts a flowchart of a computer-implemented method for automatically identifying and mitigating jamming attacks on autonomous vehicles by performing safety actions according to one or more embodiments of the present invention;

DETAILED DESCRIPTION

Figure 1:
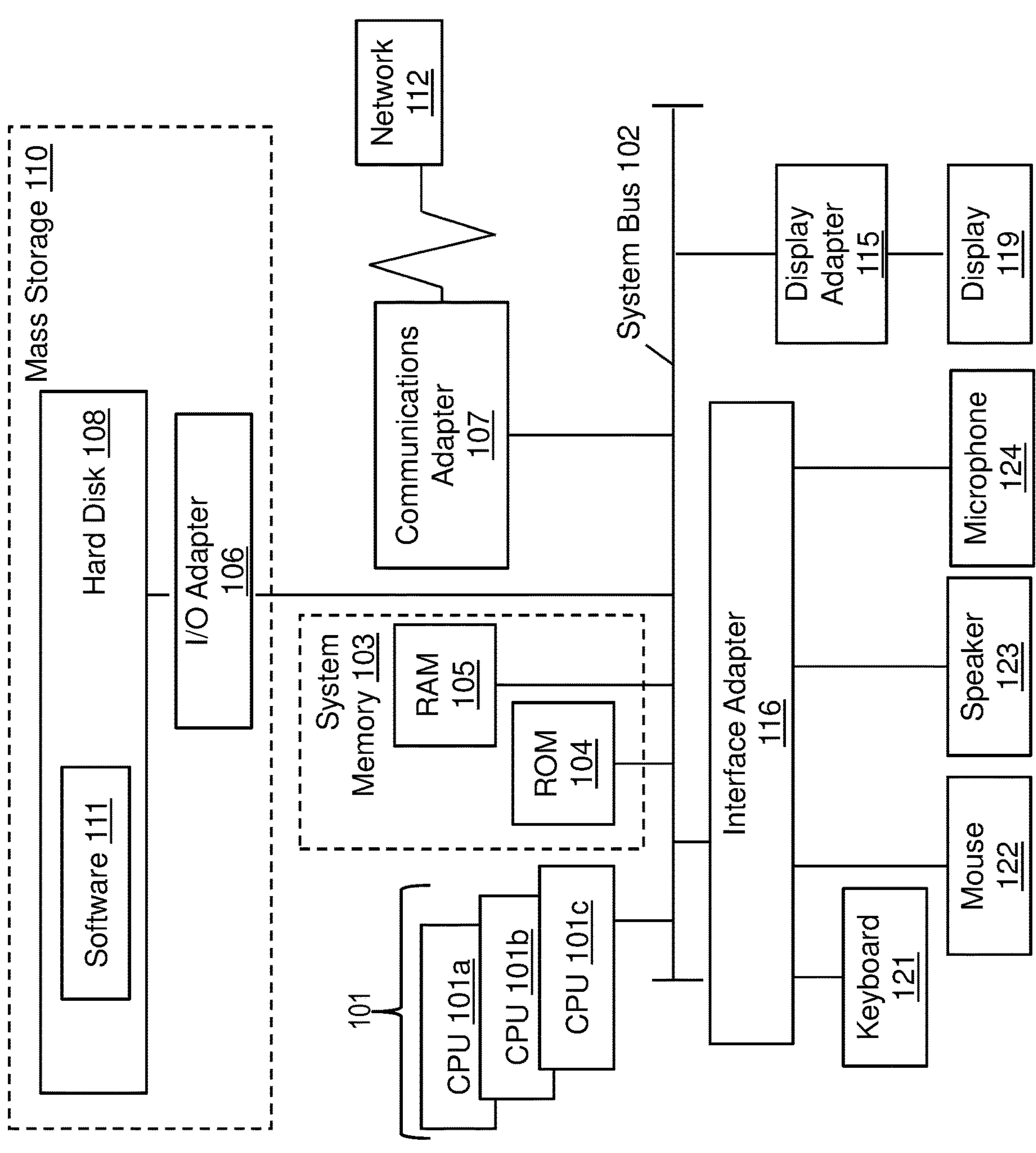
FIG. 1 depicts a block diagram of an example computer system for use in conjunction with one or more embodiments of the present invention.

One or more embodiments automatically identify and mitigate jamming attacks on autonomous vehicles such that safety actions can be performed. Technical solutions and benefits include a novel method and system to perform safety measures in the event of jamming attacks on one or more sensors of autonomous vehicles. One or more embodiments assist occupants avoid and/or mitigate potential harm or the threats to the occupants of the autonomous vehicle, to pedestrians, to property, etc.

For example, once the system detects that an object suddenly disappears from the view of a sensor because of a jamming attack, the system gathers data from all available sensors to determine if the other sensors can still sense the object. If the object is not sensed by other sensors, the system shares the data with a central server for further analysis. This enables analysts to determine what happened and if the incident is to be recorded as an exception. On the other hand, if the object can be detected by any other sensor, then the system provides an alert to the occupant of the vehicle about the potential danger. This alert can include displaying on the main screen of the vehicle a visual aid to help the occupant detect what was the position or location of the object that disappeared. Concurrently, the system triggers various safety measures to prevent any potential accident with the object. The safety measures may include, but are not limited to, reducing the vehicle speed, stopping the vehicle, turning on emergency lights, etc., and any combination thereof.

One or more embodiments described herein can utilize machine learning techniques to perform tasks, such as classifying a feature of interest. More specifically, one or more embodiments described herein can incorporate and utilize rules-based decision making and artificial intelligence (AI) reasoning to accomplish the various operations described herein, namely classifying a feature of interest. The phrase "machine learning" broadly describes a function of electronic systems that learn from data. A machine learning system, engine, or module can include a trainable machine learning algorithm that can be trained, such as in an external cloud environment, to learn functional relationships between inputs and outputs, and the resulting model (sometimes referred to as a "trained neural network," "trained model," "a trained classifier," and/or "trained machine learning model") can be used for classifying a feature of interest. In one or more embodiments, machine learning functionality can be implemented using an Artificial Neural Network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional Neural Networks (CNN) are a class of deep, feed-forward ANNs that are particularly useful at tasks such as, but not limited to analyzing visual imagery and natural language processing (NLP). Recurrent Neural Networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments described herein.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101*a*, 101*b*, 101*c*, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, a microphone 124, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, storage capability including the system memory 103 and the mass storage 110, input means such as the keyboard 121, the mouse 122, and the microphone 124, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
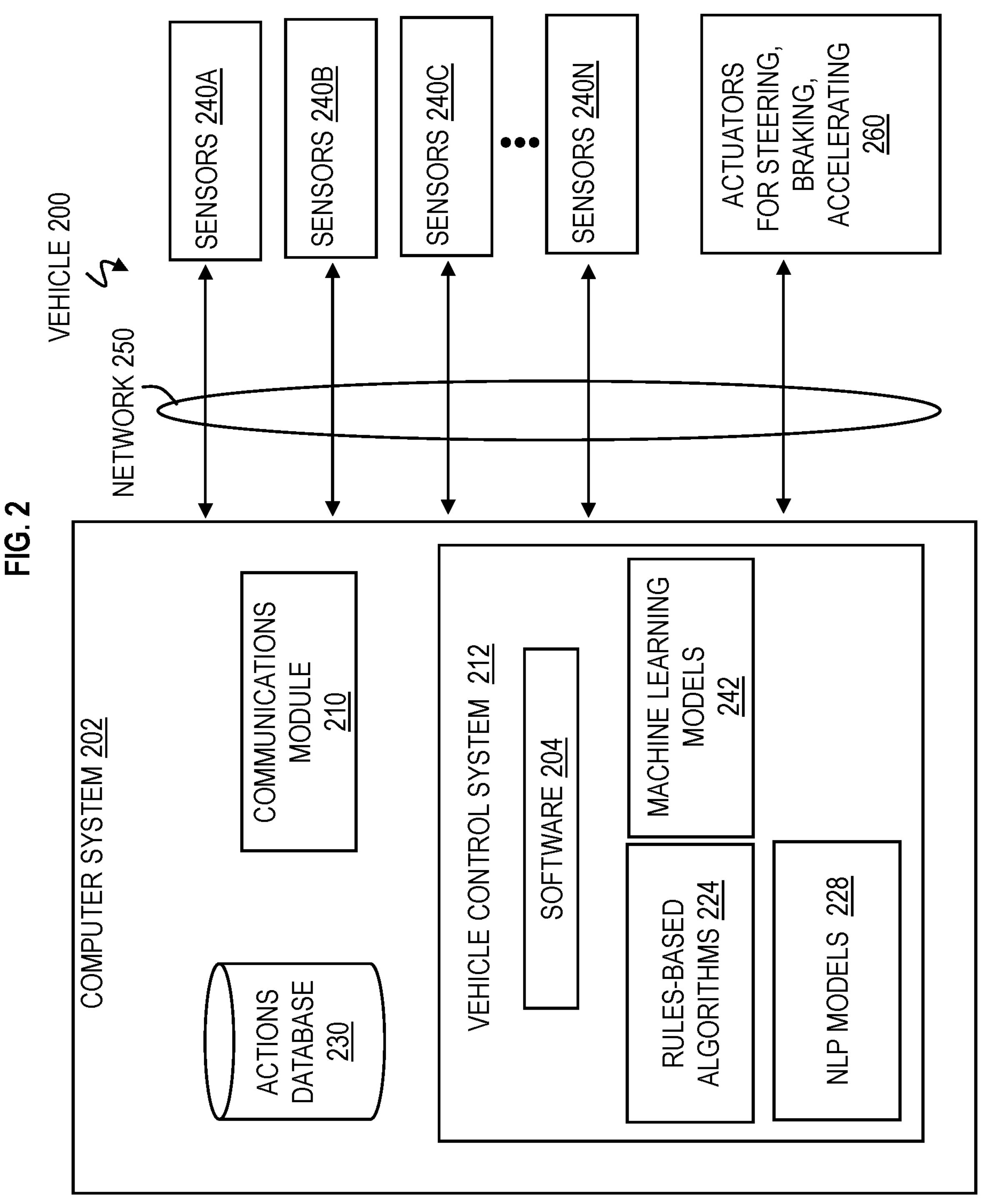
FIG. 2 depicts a block diagram of an example system for automatically identifying and mitigating jamming attacks on autonomous vehicles and performing safety actions according to one or more embodiments of the present invention.

FIG. 2 depicts a block diagram of an example vehicle 200 configured for automatically identifying and mitigating jamming attacks on autonomous vehicles and for automatically performing safety actions to prevent potential harm to occupants, pedestrians, property, etc., according to one or more embodiments. The vehicle 200 includes all of the hardware and software for operating as a self-driving vehicle or an autonomous vehicle. The vehicle 200 includes a computer system 202 configured to communicate over a network 250 with many different sensors, such as sensors 240A, sensors 240B through sensors 240N for capturing and recognizing a surrounding environment of the vehicle. The sensors 240A, 240B through 240N can generally be referred to as sensors 240 and are utilized to access the external environment of the vehicle 200.

For explanation purposes and not limitation, some example scenarios of the vehicle 200 are discussed. It should be appreciated that one or more embodiments are not limited to the example scenarios. For example, some example scenarios may identify the sensors 240A as light detection and ranging (LiDAR) sensors or laser imaging, detection, and ranging sensors. LiDAR sensors utilize a method for determining ranges by targeting an object or a surface with a laser and measuring the time for the reflected light to return to the receiver. LiDAR can operate in a fixed direction (e.g., horizontal) and/or it may scan multiple directions, in which case it is sometimes referred to as LiDAR scanning or three-dimensional (3D) laser scanning, which is a special combination of 3D scanning and laser scanning.

In many cases, the LiDAR is the main navigation mechanism on autonomous vehicles for Levels 3-5, and therefore by jamming or interfering with the LiDAR system, an attacker can disrupt the autonomous navigation of the vehicle. A group of researchers were able to jam, spoof, and/or disrupt the LiDAR of an autonomous vehicle to cause objects to disappear from in front of the vehicle, such as for example, cause the object (e.g., a wall, another car, or even a pedestrian) to disappear from in front of the vehicle, when in fact the object is actually present. The researchers were able to leverage "laser-based spoofing techniques" to selectively remove the LiDAR point cloud data of genuine objects. The researchers were able to achieve a 92.7% success rate in removing 90% of a target obstacle's cloud points. As an example, an attacker can place a barrier in front of the vehicle, use a jammer to make the barrier "invisible" to the vehicle, and then cause the vehicle to crash into the unseen barrier. This is a dangerous attack because the car crash into the obstacle can be utilized by an attacker to execute a variety of crimes including taking/removing the passenger(s) against his/her will, physically harming/attacking the passenger, robbing the passenger, etc. An attacker may utilize the jamming attack to cause damage to the vehicle by crashing into the undetected object. Additionally, jamming the LiDAR of vehicles can be used to create disruption in many ways such as, for example, creating artificial traffic congestion (because of accidents), supporting an attack having an unlawful use of violence and intimidation against civilians in a city/town/district, preventing the movement of first responders (e.g., police, fire department, ambulance, search and rescue, etc.), etc.

In one or more embodiments, the sensors 240 can be representative of any type of sensor equipment including, for example, radar sensors, video cameras, LiDAR sensors, ultrasonic sensors, thermal imaging sensors, etc., which capture information of the surrounding environment of the vehicle 200 for processing by vehicle control system 212.

The vehicle control system 212 includes various components, modules, engines, etc., and can be implemented as instructions stored on a computer-readable storage medium, as hardware modules, as special-purpose hardware (e.g., application specific hardware, application specific integrated circuits (ASICs), as embedded controllers, hardwired circuitry, etc.), and/or as some combination or combinations of these. In examples, the engine(s) described herein can be a combination of hardware and programming. The programming can be processor executable instructions stored on a tangible memory, and the hardware can include processing circuitry for executing those instructions. Thus, a system memory can store program instructions that when executed by processing circuitry implement the engines described herein. Other engines can also be utilized to include other features and functionality described in other examples herein. Alternatively or additionally, the vehicle control system 212 can include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

The computer system 202 includes the vehicle control system 212, software applications 204, rules-based algorithm 224, NLP models 228, machine learning models 242, etc., and can include functionality and features of the computer system 100 in FIG. 1 including various hardware components and various software applications such as software 111 which can be executed as instructions on one or more processors 101 in order to perform actions according to one or more embodiments of the invention. The software application 204 can include, be integrated with, and/or call various other pieces of software, algorithms, application programming interfaces (APIs), speech-to-text software, text-to-speech software, etc., to operate as discussed herein. The software applications 204 may be representative of numerous software applications designed to work together. Each of the sensors 240A-240N are connected to the computer system 202 which can be wired and/or wiredly connected. Moreover, the network 250 can be a wired and/or wireless communication network.

The vehicle 200 can include a communications module 210 having a transmitter and receiver (e.g., a transceiver) for transmitting and receiving signals. The vehicle control system 212 provides control signals to various actuators 260 for steering, braking, acceleration, and other known functions of the vehicle 200, as understood by one of ordinary skill in the art.

The computer system 202 may be representative of numerous computer systems and/or distributed computer systems configured to provide services to the vehicle 200. The computer system 202 can connect to a cloud computing environment such as a cloud computing environment 50 depicted in FIG. 8, as discussed further herein.

Figure 3A:
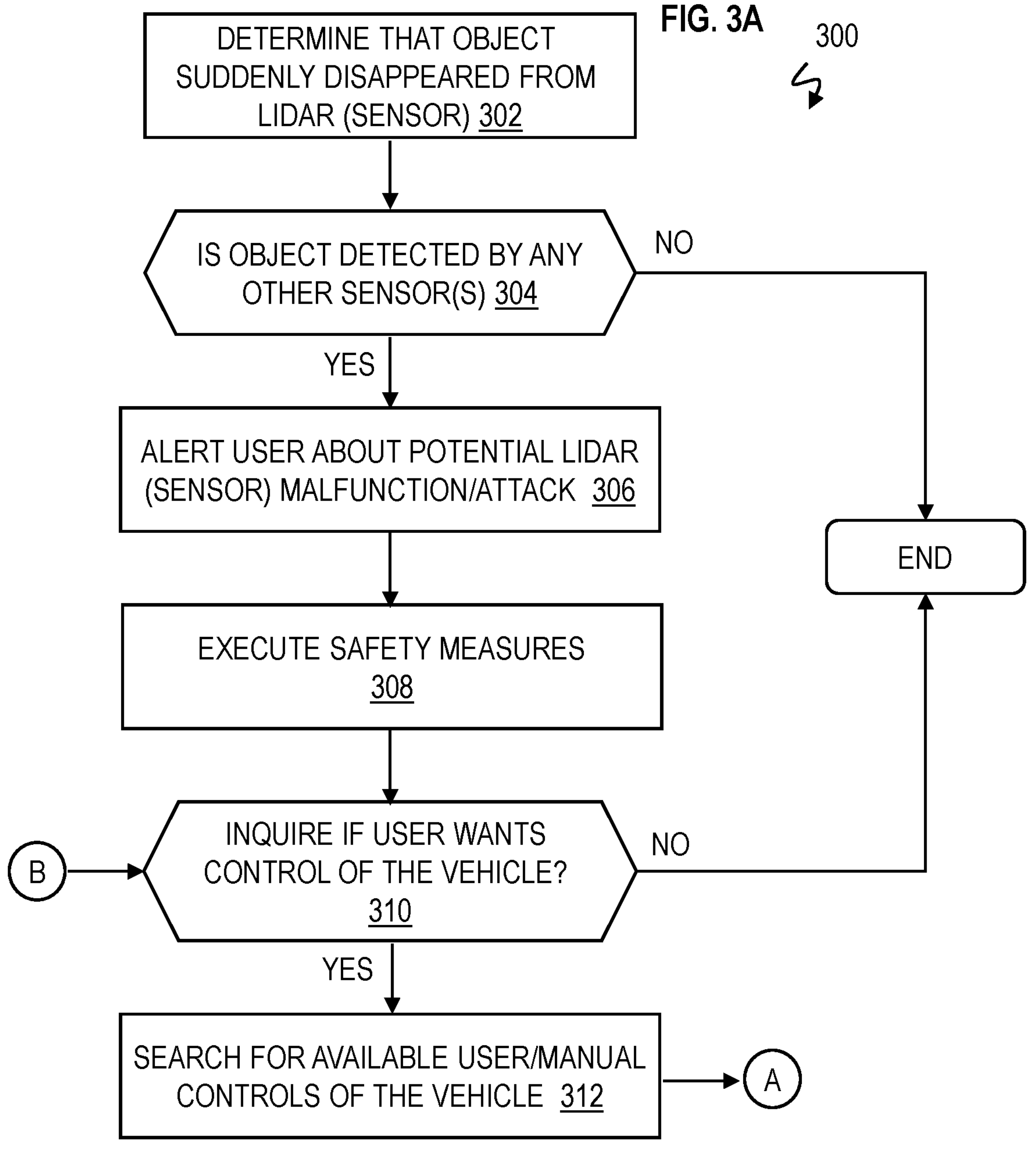
FIGS. 3A and 3B depict a flowchart of a computer-implemented method for automatically identifying and mitigating jamming attacks on autonomous vehicles and performing security actions according to one or more embodiments of the present invention.
Figure 3B:
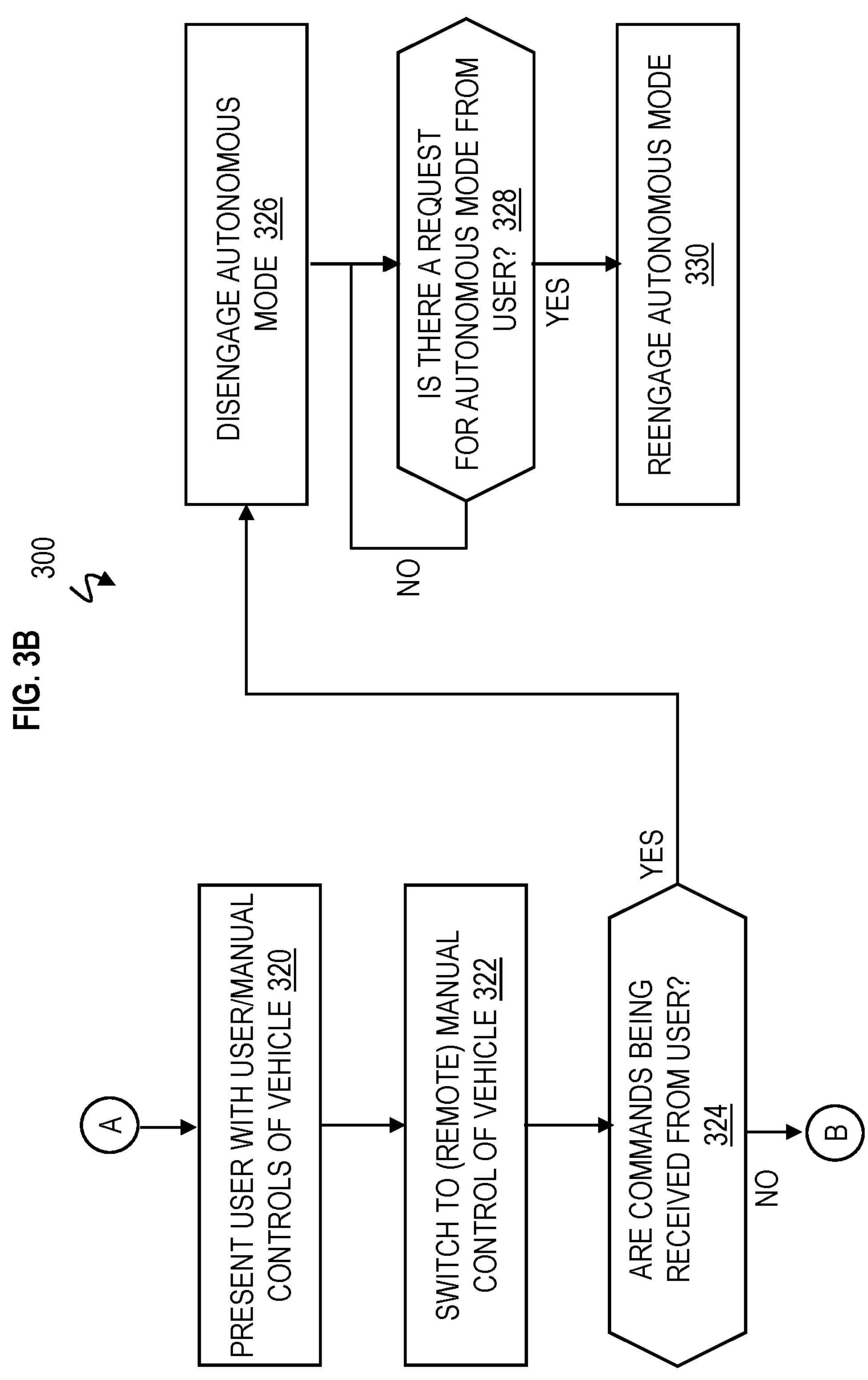

FIGS. 3A and 3B depict a flowchart of a computer-implemented method 300 for automatically identifying and mitigating jamming or spoofing attacks on autonomous vehicles and for automatically performing safety actions to prevent a potential threat to occupants of the vehicle, pedestrians in the vicinity of the vehicle, property, etc., according to one or more embodiments. The computer-implemented method 300 is executed by the computer system 202. Reference can be made to any figures discussed herein.

Figures 4A, 4B:
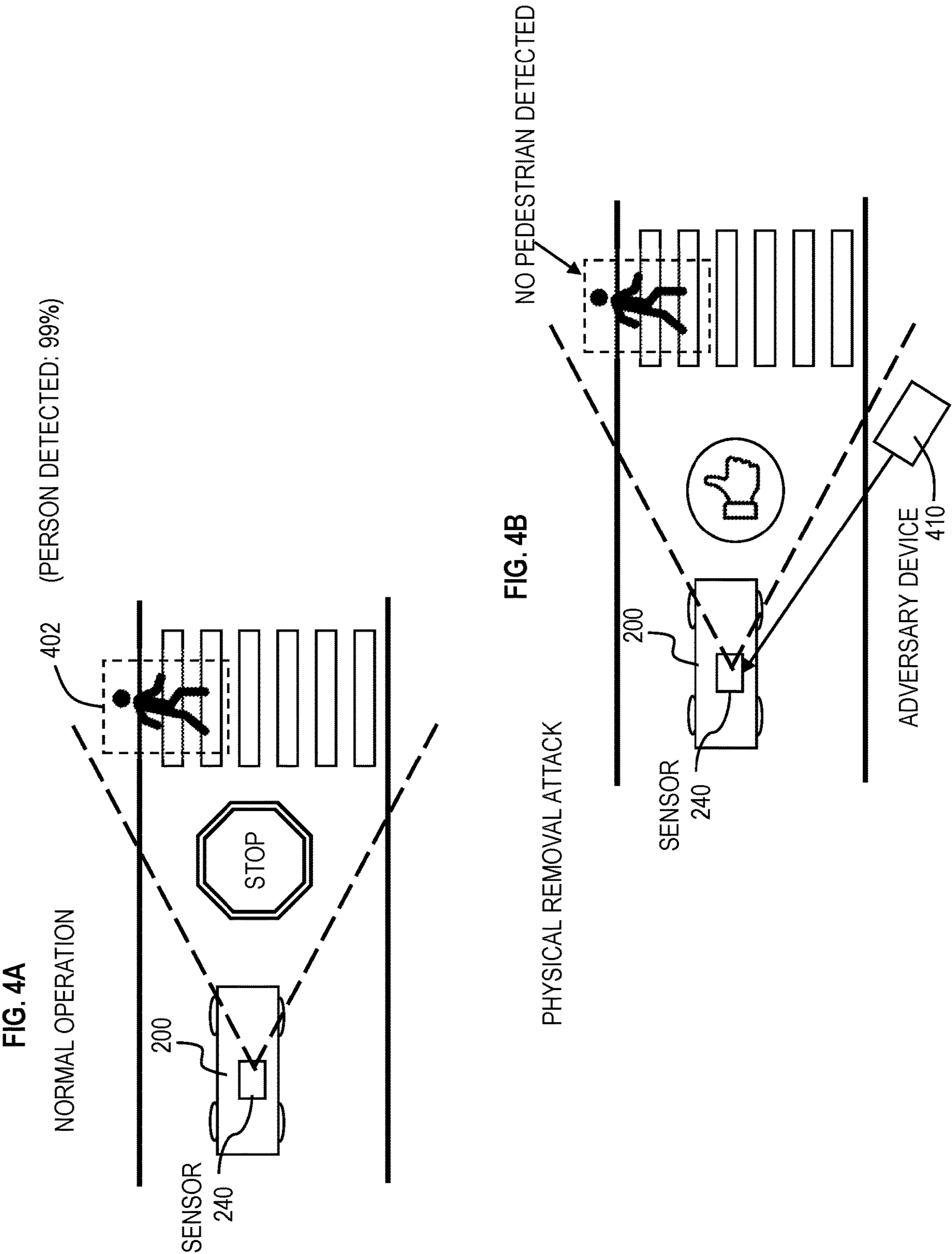
FIG. 4A depicts an example scenario of detecting an object before jamming by an electronic device according to one or more embodiments of the present invention.
FIG. 4B depicts an example scenario of jamming by an electronic device to prevent detection of the object in FIG. 4A according to one or more embodiments of the present invention.

At block 302 of the computer-implemented method 300, the vehicle control system 212 is configured to determine that a previously detected object suddenly disappeared from the LiDAR sensors 240A of the vehicle 200. The vehicle control system 212 used information from the LiDAR sensors 240A to detect an object 402 in front of the vehicle 200 as depicted in FIG. 4A. In this example, the object 402 is illustrated as a pedestrian but the object 402 can be representative of any obstacle. Under normal operation, the vehicle control system 212 causes the vehicle 200 to stop in order to avoid hitting the object 402. Stopping the vehicle 200 under normal conditions or operations may include receiving signals as sensor information from the LiDAR sensors 240A, where the vehicle control system 212 has rules-based algorithms 224, machine learning models 242, and/or any other software that process the signals received from the LiDAR sensors 240A. In FIG. 4B, an electronic radio frequency device 410 is transmitting laser pulses and/or radio waves in the wavelength of lasers to be captured by the LiDAR sensors 240A in order to jam, spoof, and/or deceive the vehicle control system 212 into failing to recognize the object 402. In FIG. 4B, the object is present but the vehicle control system 212 is prevented from detecting the object using the LiDAR sensors 240A because of the pulses and/or radio waves transmitted from the electronic radio frequency device 410 and correspondingly received by the LiDAR sensors 240A; this effectively jams the LiDAR sensors 240A such that useable information cannot be obtained to detect the object. The terms jamming attacks, spoofing attacks, and deception attacks can be utilized interchangeably.

The provided example scenario is detecting the object 402 under normal conditions or operation such that the vehicle 200 stops and/or would prepare to stop in FIG. 4A. FIG. 4B shows the electronic radio frequency device 410 being utilized to jam the LiDAR sensor thereby causing the detected object 402 to suddenly disappear from the view and perspective of the LiDAR sensor although the object is actually present. In FIG. 4B, a vehicle may continue moving forward without detecting the object in front of the vehicle.

At block 304, in response to the sudden disappearance of the object 402, the vehicle control system 212 is configured to check if the object 402 is detected by any other sensors 240. When (No) the object is not detected by any other sensors, the flow ends.

Continuing the example scenario, the LiDAR sensors 240A detected the object 402 but the object 402 suddenly disappeared (i.e., was no longer detected). As such, the vehicle control system 212 checks and processes signals from the other sensors 240B, 240C, through 240N to determine whether any other sensors 240 detect the object 402. Suddenly disappearing refers to an object being present at one instance and then not being present, without there being a trajectory for the movement of the object 402 out of the view or detection of the sensor. The sudden disappearance of the object within a predetermined time, for example, 0.5 milliseconds (ms), 1 ms, 2 ms, etc., can be utilized by the software application 204 to trigger execution of block 304. As an example algorithm, the software application 204 of the vehicle control system 212 is configured to 1) monitor for detection of an object using signals from the LiDAR sensors 240A, 2) determine a sudden disappearance of the detected object within a predetermined time (e.g., 1 ms) at which the object is no longer detected by the LiDAR sensors 240A and when there is no occurrence of a trajectory or movement of the object out of the field-of-view of the LiDAR sensors 240A, and 3) trigger the check of other sensors 240 to find the object that disappeared from the LiDAR sensors 240A. The vehicle control system 212 includes one or more trajectory prediction algorithms for predicting the trajectory of an object as known by one of ordinary skill in the art. Accordingly, the vehicle control system 212 recognizes that the detected object 402 should not suddenly disappear without having some trajectory or movement.

Figures 6A, 6B:
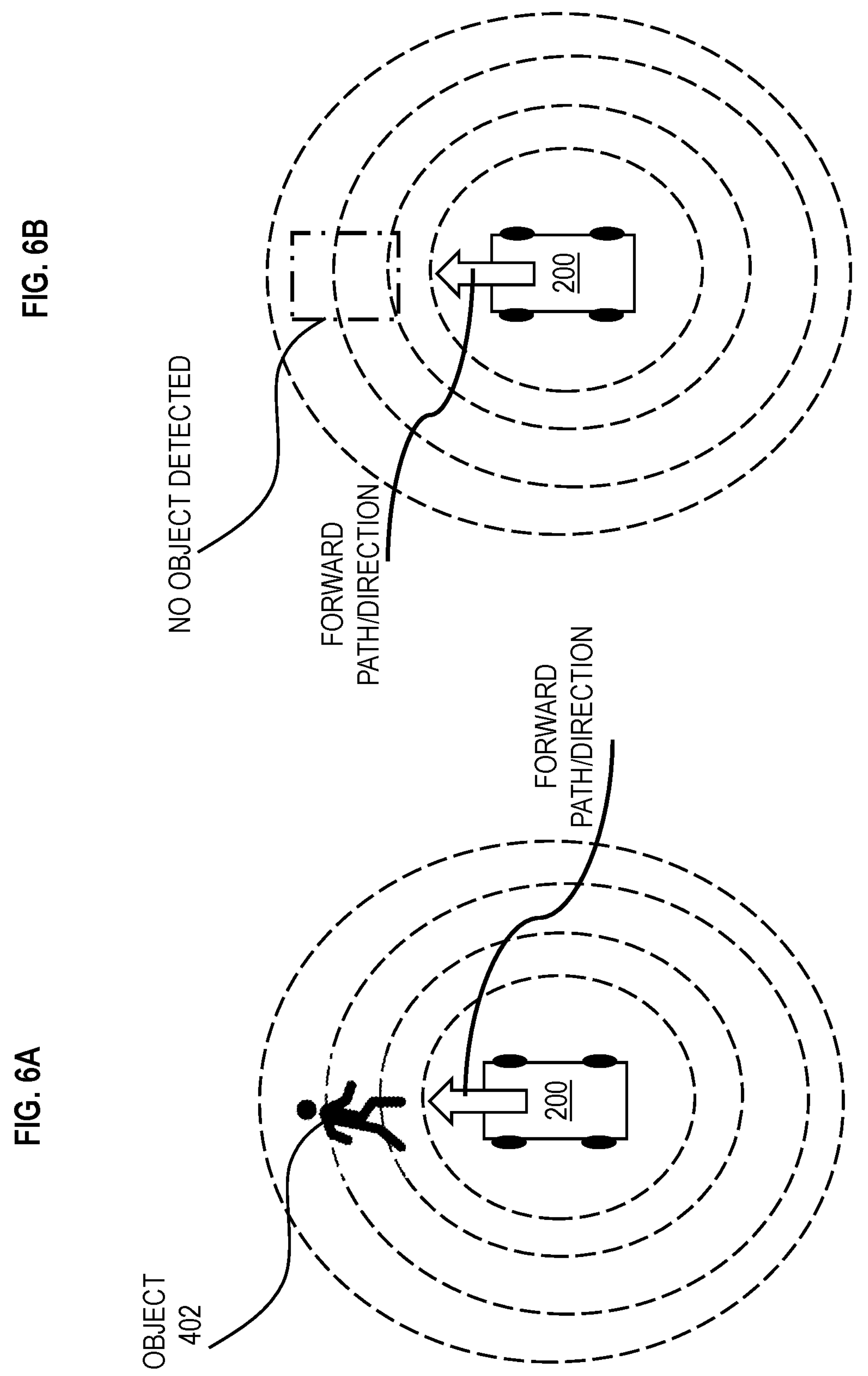
FIG. 6A depicts an example of an object detected according to one or more embodiments of the present invention.
FIG. 6B depicts the sudden disappearance of the object detected in FIG. 6A according to one or more embodiments of the present invention.

At block 306, when at least one other sensor 240 (e.g., other than the LiDAR sensor 240A) detects the object 402, the vehicle control system 212 is configured to alert the occupant about the potential LiDAR sensor attack or malfunction. Using the display 119, speakers 123, smart device of the occupant, etc., the alert can be presented as an audio message, video message, textual message, holographic message, etc. In one or more embodiments, the alert can be a holographic message using a holographic device or projector in the vehicle 200. The alert is a message that informs the occupant about the potential LiDAR sensor malfunction or attack. For example, the alert (e.g., audio, video, text, haptic, holographic, etc.) can be a combination of warning messages of the potential attack and/or LiDAR malfunction by an audible message through the speakers 123 in the vehicle 200, a displayed message on the display 119 in the vehicle, a text message to a phone number of the passenger in the vehicle 200, a phone call to the passenger in the vehicle 200, a holographic message, etc., and by any combination of the same or other communication techniques. The smart device can include phones, tables, computer, wearables, etc. The software applications 204 may employ, call, and/or instruct a speech-to-text engine (not shown) to covert the audio to text and a text-to-speech engine (not shown) to convert text-to-speech as understood by one of ordinary skill in the art. In one or more embodiments, the alert may include the warning message and display of images to the occupant as depicted in FIGS. 6A and 6B, which respectively illustrate detection of the object and the previous location at which the object was last detected.

At block 308, when at least one other sensor 240 (e.g., other than the LiDAR sensor 240A) detects the object 402, the vehicle control system 212 is configured to execute safety measures to prevent a potential crash or incident involving an undetected object that was previously detected. There can be a myriad of safety measures executed by the vehicle control system 212. One or more safety measures/actions can be stored in a safety actions database 230. The vehicle control system 212 can reduce the vehicle speed to a predefined amount, can stop the vehicle 200, turn on emergency lights (including hazard lights, headlamps, etc.), etc. Additional safety measures by the vehicle control system 212 may include locking the doors, raising/closing the windows, contacting security services (such as the police, fire department, a local security agency, etc.), performing a livestream of the cameras to a secure contact (e.g., a predesignated friend, police, administrator, etc.), playing an audible warning through one or more designated external speakers to "move away from the vehicle security is on the way", honking the horn, moving the vehicle (slightly) backward, etc.

At block 310, the vehicle control system 212 is configured to inquire whether the occupant wishes to take control of the vehicle 200. The inquiry can be displayed on the display 119, can be an audio/video message displayed and played on display 119 and speakers 123, can be presented on the smart device of the user, etc. The occupant can respond by making a selection (e.g., using Yes or No buttons) on the display 119, making a verbal selection (e.g., Yes or No) using microphone 124, etc. Also, the occupant can make a selection (e.g., Yes or No) using his/or smart device (e.g., phone, tablet, laptop, wearable, etc.) that is communicatively connected to the communications module 210 of the vehicle 200. If (No), the flow ends.

At block 312, when (Yes) the occupant wishes to take control of the vehicle 200, the vehicle control system 212 is configured to search for available user/manual controls of the vehicle 200.

At block 320, the vehicle control system 212 is configured to present the occupant with user controls of the vehicle 200. In one or more embodiments, the vehicle control system 212 may instruct the occupant to place his/her hands on the steering wheel (if present), place your foot on the pedals (e.g., brake, accelerator, clutch, etc.), etc. In one or more embodiments, the vehicle control system 212 may cause the display of user controls on the display 119 for the user to select to control the vehicle 200, such as to control the actuators 260 of the vehicle 200. In one or more embodiments, the vehicle control system 212 may cause a remote application to be displayed on a smart device of the occupant such that the occupant can control the actuators 260 of the vehicle 200. In one or more embodiments, the vehicle control system 212 may enable the vehicle 200 to be controlled by voice commands issued by the occupant by using NLP models 228 to process the voice commands to control the vehicle 200.

At block 322, the vehicle control system 212 is configured to switch the vehicle 200 from autonomous mode to manual control of the vehicle 200. Accordingly, the vehicle 200 is not operating as a self-driving car or autonomous car. As discussed herein, this may include activating user controls including steering control, braking control, accelerating control, etc. In one or more embodiments, the user controls may be displayable on the display 119. In one or more embodiments, the user controls can be through a remote application on the smart device of the occupant, which is operatively connected to the communications module 210 of the vehicle 200.

At block 324, the vehicle control system 212 is configured to check if commands are being received from user controls of the occupant. If (No) commands are not being received, flow proceeds to block 310 to check if the user wishes to switch back from user/manual control to autonomous control.

At block 326, when (Yes) commands are being received by the vehicle control system 212, the vehicle control system 212 is configured to disengage autonomous mode of the vehicle 200.

At block 328, the vehicle control system 212 is configured to check if there is a request for autonomous mode from the occupant. If (No) there is not a request for autonomous mode from the occupant, flow continuously checks. At block 330, when (Yes) there is a request for autonomous mode, the vehicle control system 212 is configured to reengage autonomous mode.

Figure 5:
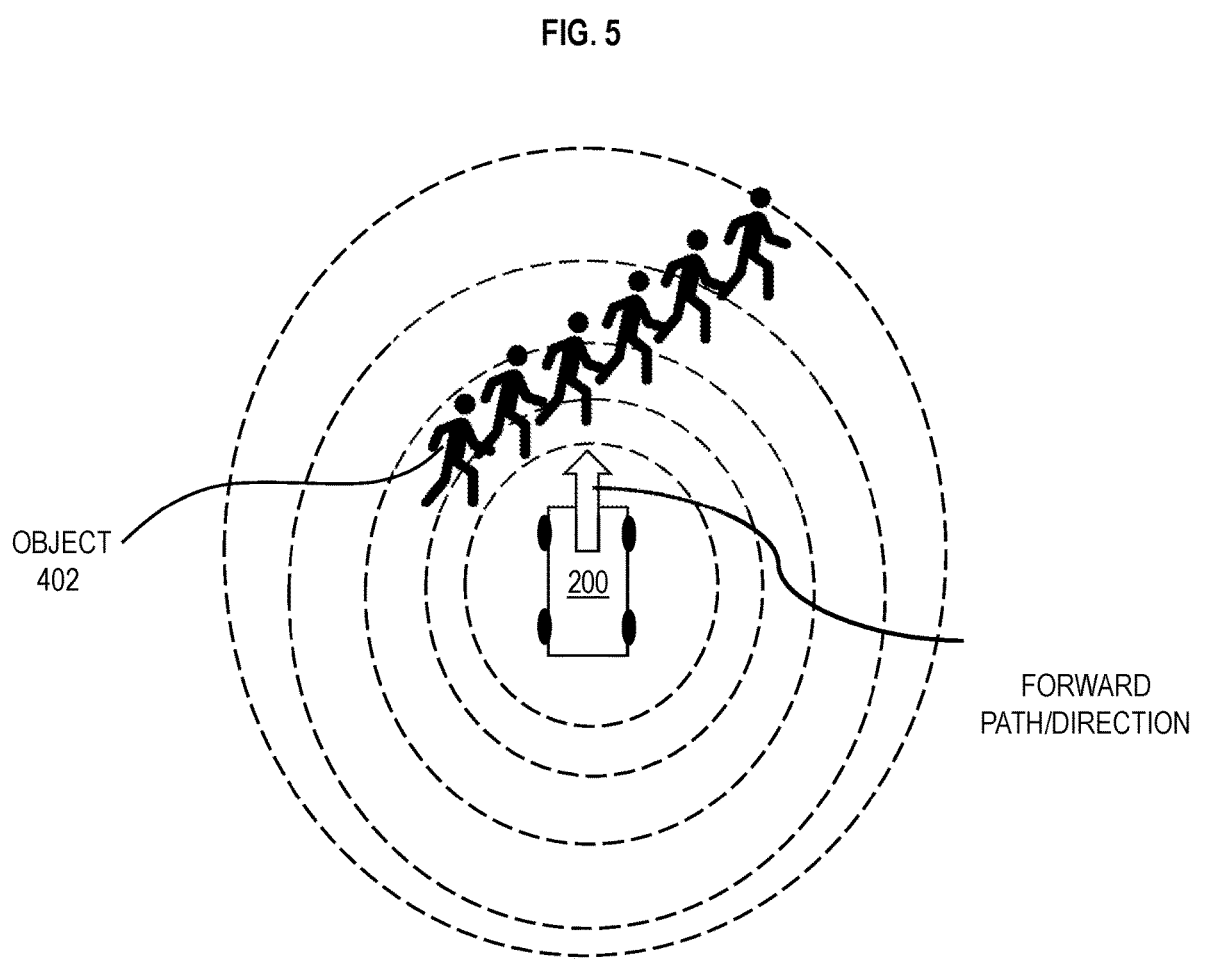

FIG. 5 depicts an example of an expected trajectory of an object 402. The vehicle control system 212 is configured to detect the object 402 using, for example, the LiDAR sensor 240A. FIG. 6A depicts an example of an object detected, while FIG. 6B depicts the sudden disappearance of the object as discussed herein. However, the vehicle control system 212 expects to see a predicted trajectory as depicted in FIG. 5 but instead sees the view in FIG. 6B using the LiDAR sensor 240A. For example, the sudden disappearance of the object 402 detected in FIG. 6A to no object detected by the LiDAR sensor 240A in FIG. 6B may occur in 1 ms, without any predicted trajectory. In FIGS. 5, 6A, and 6B, the dashed circular lines represent the measurement area or field-of-view for the LiDAR sensor 240A, in which a trajectory of the object is expected to appear. The lack of any trajectory for a previously detected object is a trigger for the software application 204 to check other sensors 240 for the detection of the missing object. The vehicle control system 212 can predict a possible trajectory of the object 402 using known technology as understood by one of ordinary skill in the art. The vehicle control system 212 can include, call, and/or employ one or more trajectory prediction algorithms in response to an object suddenly disappearing from the LiDAR sensor 240A. One or more of the machine learning models 242 may have a trajectory prediction algorithm that is trained to perform trajectory prediction upon detection of the object. As part of the trajectory prediction algorithm, the machine learning model 242 can use a long short-term memory (LSTM) network and a generative adversarial network (GAN) to determine the potential movements of the object 402.

Upon recognition of the disappearance of the object 402 from detection of the LiDAR sensors 240A, FIGS. 6A and 6B can be displayed on the display 119 of the vehicle 200 to inform the user. Also, a warning can be displayed indicating that the object disappeared.

FIG. 7 depicts a flowchart of a computer-implemented method 700 for automatically identifying and mitigating jamming, spoofing, and/or deception attacks on autonomous vehicles by performing safety actions according to one or more embodiments. Reference can be made to any figures discussed herein.

At block 702, the vehicle control system 212 is configured to determine that an object (e.g., object 402) previously detected is no longer detected by a sensor (e.g., LiDAR sensor 240A) of a vehicle 200. At block 704, the vehicle control system 212 is configured to, in response to the object previously detected no longer being detected by the sensor, determine that another sensor (e.g., sensors 240B-240N) of the vehicle 200 detects the object (e.g., object 402). At block 706, the vehicle control system 212 is configured to, in response to the object previously detected no longer being detected by the sensor, perform safety actions based on another sensor (e.g., sensors 240B-240N) detecting the object (e.g., object 402).

Determining that another sensor (e.g., sensors 240B-240N) of the vehicle 200 detects the object includes checking whether any sensors (e.g., sensors 240B-240N) of the vehicle 200 detects the object and determining that the object is detected by another sensor (e.g., sensors 240B-240N). Performing the safety actions based on another sensor (e.g., sensors 240B-240N) detecting the object includes causing the vehicle 200 to stop (e.g., via the various actuators 260) in order to avoid a location of the object previously detected by the sensor (e.g., LiDAR sensor 240A). Performing the safety actions based on another sensor (e.g., sensors 240B-240N) detecting the object includes alerting an occupant of the vehicle 200.

Performing the safety actions based on another sensor (e.g., sensors 240B-240N) detecting the object includes presenting an occupant of the vehicle 200 with an available control (e.g., user/manual controls) of the vehicle 200. Performing the safety actions based on another sensor (e.g., sensors 240B-240N) detecting the object includes receiving a command from an occupant of the vehicle 200 in response to presenting the occupant of the vehicle 200 with control of the vehicle 200. Performing the safety actions based on another sensor detecting the object includes switching from autonomous mode to manual control of the vehicle 200.

In one or more embodiments, the machine learning models 242 and/or NLP models 228 can include various engines/classifiers and/or can be implemented on a neural network. The features of the engines/classifiers can be implemented by configuring and arranging the computer system 202 to execute machine learning algorithms. In general, machine learning algorithms, in effect, extract features from received data (e.g., the complete message formed of segmented messages) in order to "classify" the received data. Examples of suitable classifiers include but are not limited to neural networks, support vector machines (SVMs), logistic regression, decision trees, hidden Markov Models (HMMs), etc. The end result of the classifier's operations, i.e., the "classification," is to predict a class (or label) for the data. The machine learning algorithms apply machine learning techniques to the received data in order to, over time, create/train/update a unique "model." The learning or training performed by the engines/classifiers can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier. Unsupervised learning can utilize additional learning/training methods including, for example, clustering, anomaly detection, neural networks, deep learning, and the like.

In one or more embodiments, the engines/classifiers are implemented as neural networks (or artificial neural networks), which use a connection (synapse) between a pre-neuron and a post-neuron, thus representing the connection weight. Neuromorphic systems are interconnected elements that act as simulated "neurons" and exchange "messages" between each other. Similar to the so-called "plasticity" of synaptic neurotransmitter connections that carry messages between biological neurons, the connections in neuromorphic systems such as neural networks carry electronic messages between simulated neurons, which are provided with numeric weights that correspond to the strength or weakness of a given connection. The weights can be adjusted and tuned based on experience, making neuromorphic systems adaptive to inputs and capable of learning. After being weighted and transformed by a function (i.e., transfer function) determined by the network's designer, the activations of these input neurons are then passed to other downstream neurons, which are often referred to as "hidden" neurons. This process is repeated until an output neuron is activated. Thus, the activated output neuron determines (or "learns") and provides an output or inference regarding the input.

Training datasets can be utilized to train the machine learning algorithms. The training datasets can include historical data of past tickets and the corresponding options/suggestions/resolutions provided for the respective tickets. Labels of options/suggestions can be applied to respective tickets to train the machine learning algorithms, as part of supervised learning. For the preprocessing, the raw training datasets may be collected and sorted manually. The sorted dataset may be labeled (e.g., using the Amazon Web Services® (AWS®) labeling tool such as Amazon SageMaker® Ground Truth). The training dataset may be divided into training, testing, and validation datasets. Training and validation datasets are used for training and evaluation, while the testing dataset is used after training to test the machine learning model on an unseen dataset. The training dataset may be processed through different data augmentation techniques. Training takes the labeled datasets, base networks, loss functions, and hyperparameters, and once these are all created and compiled, the training of the neural network occurs to eventually result in the trained machine learning model (e.g., trained machine learning algorithms). Once the model is trained, the model (including the adjusted weights) is saved to a file for deployment and/or further testing on the test dataset.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
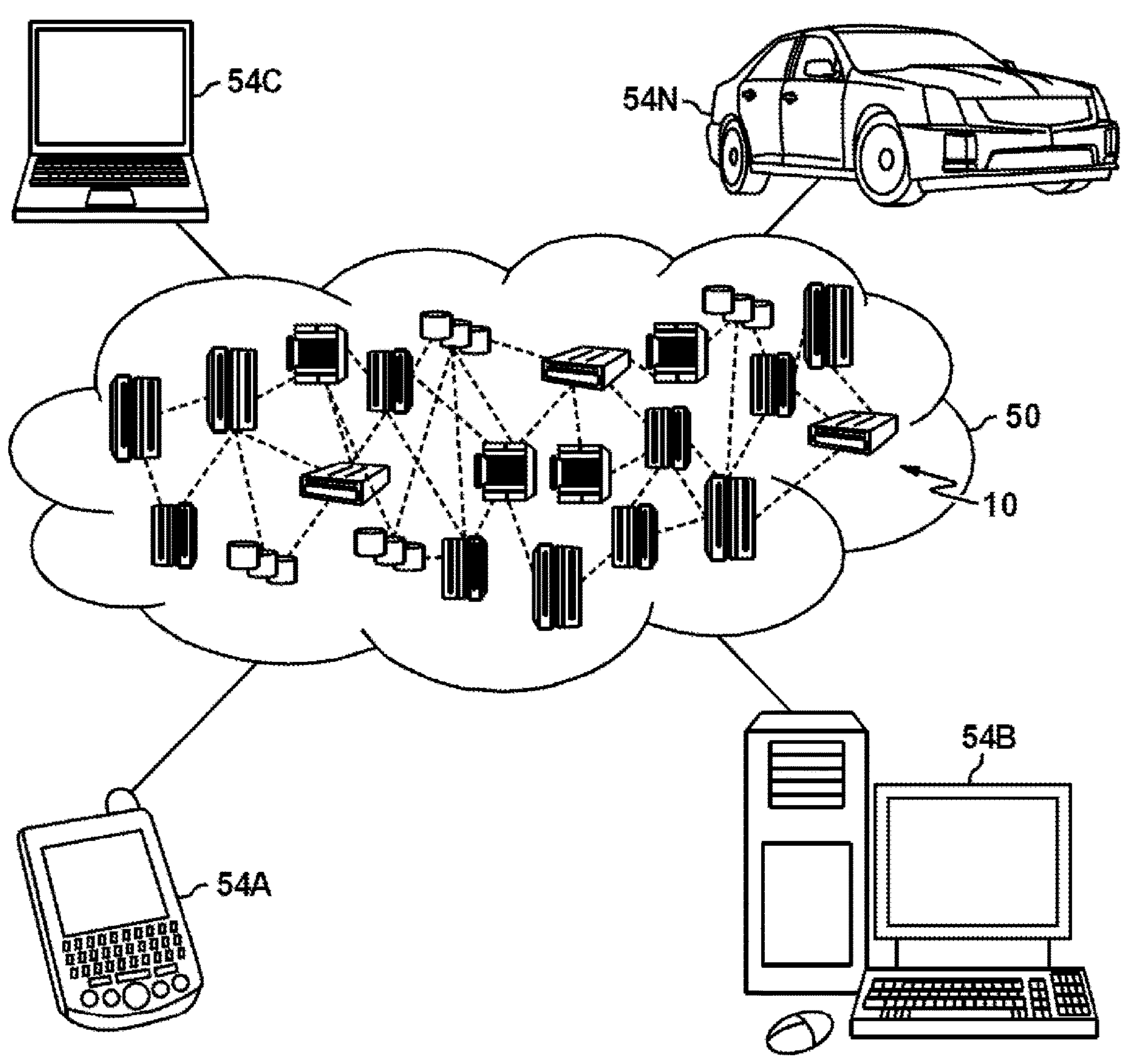
FIG. 8 depicts a cloud computing environment according to one or more embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
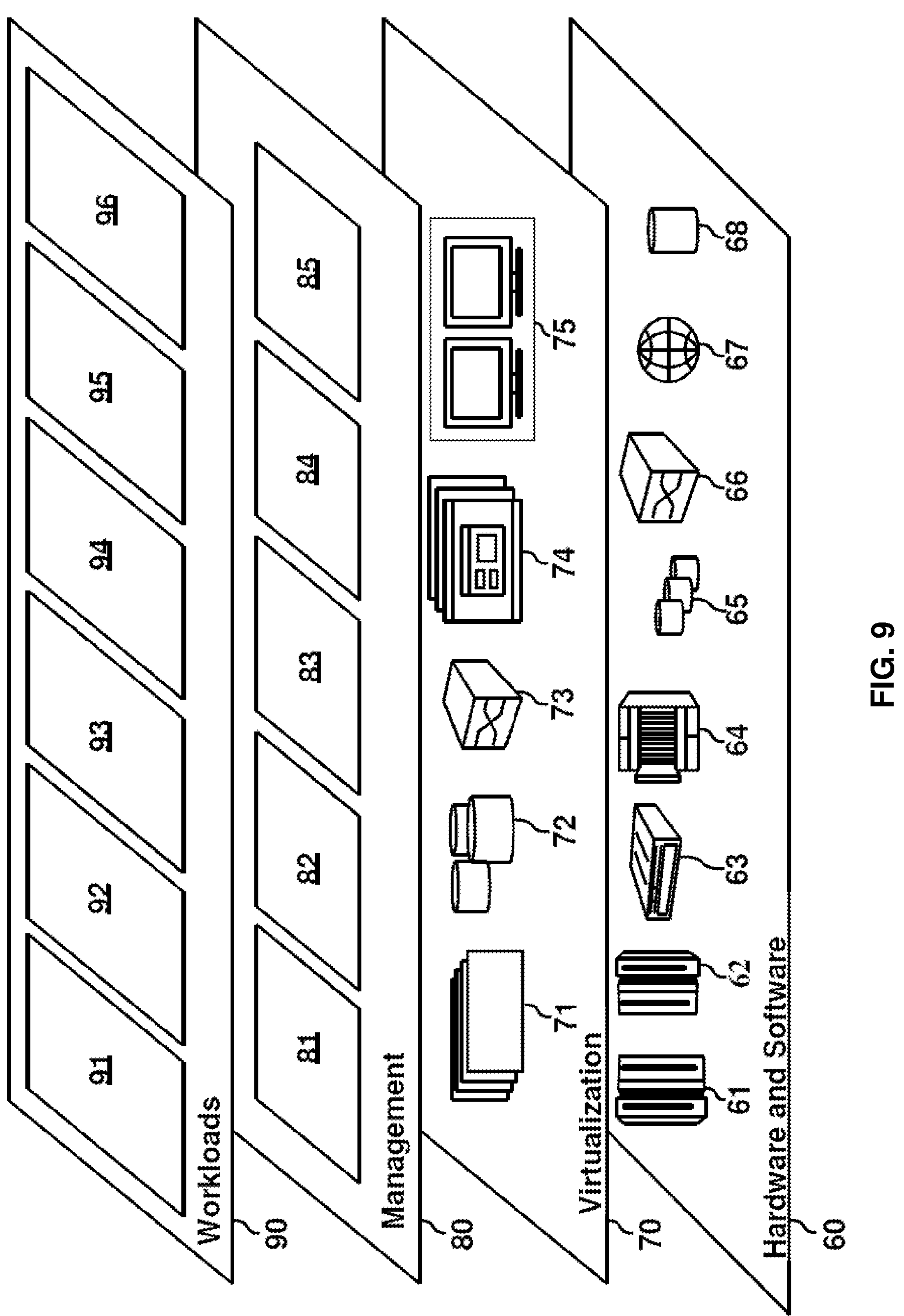
FIG. 9 depicts abstraction model layers according to one or more embodiments of the present invention.

Referring now to FIG. 9, a set of functional abstraction layers provided by cloud computing environment 50 (depicted in FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workloads and functions 96.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted, or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
determining that an object previously detected is no longer detected by a sensor of a vehicle;
determining a predicted trajectory for the object previously detected by the sensor;
in response to the object previously detected by the sensor failing to have the predicted trajectory and in response to the object previously detected no longer being detected by the sensor, determining that another sensor of the vehicle detects the object; and
in response to the object previously detected no longer being detected by the sensor, performing at least two safety actions based on the another sensor detecting the object, wherein the safety actions comprise performing a livestream, turning on emergency lights, honking a horn, or playing an audible warning external to the vehicle.

2. The computer-implemented method of claim 1, wherein determining that the another sensor of the vehicle detects the object comprises checking whether any sensors of the vehicle detect the object and determining that the object is detected by the another sensor.

3. The computer-implemented method of claim 1, wherein the safety actions further perform causing the vehicle to stop in order to avoid a location of the object previously detected by the sensor.

4. The computer-implemented method of claim 1, wherein the safety actions further perform alerting an occupant of the vehicle.

5. The computer-implemented method of claim 1, wherein the safety actions further perform presenting an occupant of the vehicle with an available control of the vehicle.

6. The computer-implemented method of claim 1, wherein the safety actions further perform receiving a command from an occupant of the vehicle in response to presenting the occupant of the vehicle with control of the vehicle; and
wherein at least one of:
the command is received from a device of the occupant of the vehicle, the device being communicatively connected to the vehicle; or
the command is a verbal command from the occupant of the vehicle.

7. The computer-implemented method of claim 1, wherein the safety actions further perform switching from autonomous mode to manual control of the vehicle.

8. A system comprising:
a memory having computer readable instructions; and
one or more processors for executing the computer readable instructions, the computer readable instructions controlling the one or more processors to perform operations comprising:
determining that an object previously detected is no longer detected by a sensor of a vehicle;
determining a predicted trajectory for the object previously detected by the sensor;
in response to the object previously detected by the sensor failing to have the predicted trajectory and in response to the object previously detected no longer being detected by the sensor, determining that another sensor of the vehicle detects the object; and
in response to the object previously detected no longer being detected by the sensor, performing at least two safety actions based on the another sensor detecting the object, wherein the safety actions comprise performing a livestream, turning on emergency lights, honking a horn, or playing an audible warning external to the vehicle.

9. The system of claim 8, wherein determining that the another sensor of the vehicle detects the object comprises checking whether any sensors of the vehicle detect the object and determining that the object is detected by the another sensor.

10. The system of claim 8, wherein the safety actions further perform causing the vehicle to stop in order to avoid a location of the object previously detected by the sensor.

11. The system of claim 8, wherein the safety actions further perform alerting an occupant of the vehicle.

12. The system of claim 8, wherein the safety actions further perform presenting an occupant of the vehicle with an available control of the vehicle.

13. The system of claim 8, wherein the safety actions further perform receiving a command from an occupant of the vehicle in response to presenting the occupant of the vehicle with control of the vehicle.

14. The system of claim 8, wherein the safety actions further perform switching from autonomous mode to manual control of the vehicle.

15. A computer program product comprising a computer readable storage medium having program instructions embodied therewith, the program instructions executable by one or more processors to cause the one or more processors to perform operations comprising:
determining that an object previously detected is no longer detected by a sensor of a vehicle;
determining a predicted trajectory for the object previously detected by the sensor;
in response to the object previously detected by the sensor failing to have the predicted trajectory and in response to the object previously detected no longer being detected by the sensor, determining that another sensor of the vehicle detects the object; and
in response to the object previously detected no longer being detected by the sensor, performing at least two safety actions based on the another sensor detecting the object, wherein the safety actions comprise performing a livestream, turning on emergency lights, honking a horn, or playing an audible warning external to the vehicle.

16. The computer program product of claim 15, wherein determining that the another sensor of the vehicle detects the object comprises checking whether any sensors of the vehicle detect the object and determining that the object is detected by the another sensor.

17. The computer program product of claim 15, wherein the safety actions further perform causing the vehicle to stop in order to avoid a location of the object previously detected by the sensor.

18. The computer program product of claim 15, wherein the safety actions further perform alerting an occupant of the vehicle.

19. The computer program product of claim 15, wherein the safety actions further perform presenting an occupant of the vehicle with an available control of the vehicle.

20. The computer program product of claim 15, wherein the safety actions further perform receiving a command from an occupant of the vehicle in response to presenting the occupant of the vehicle with control of the vehicle.

* * * * *